M. D. BAREFIELD.
INSECT DESTROYER.
APPLICATION FILED JULY 9, 1914.
1,131,458.
Patented Mar. 9, 1915.
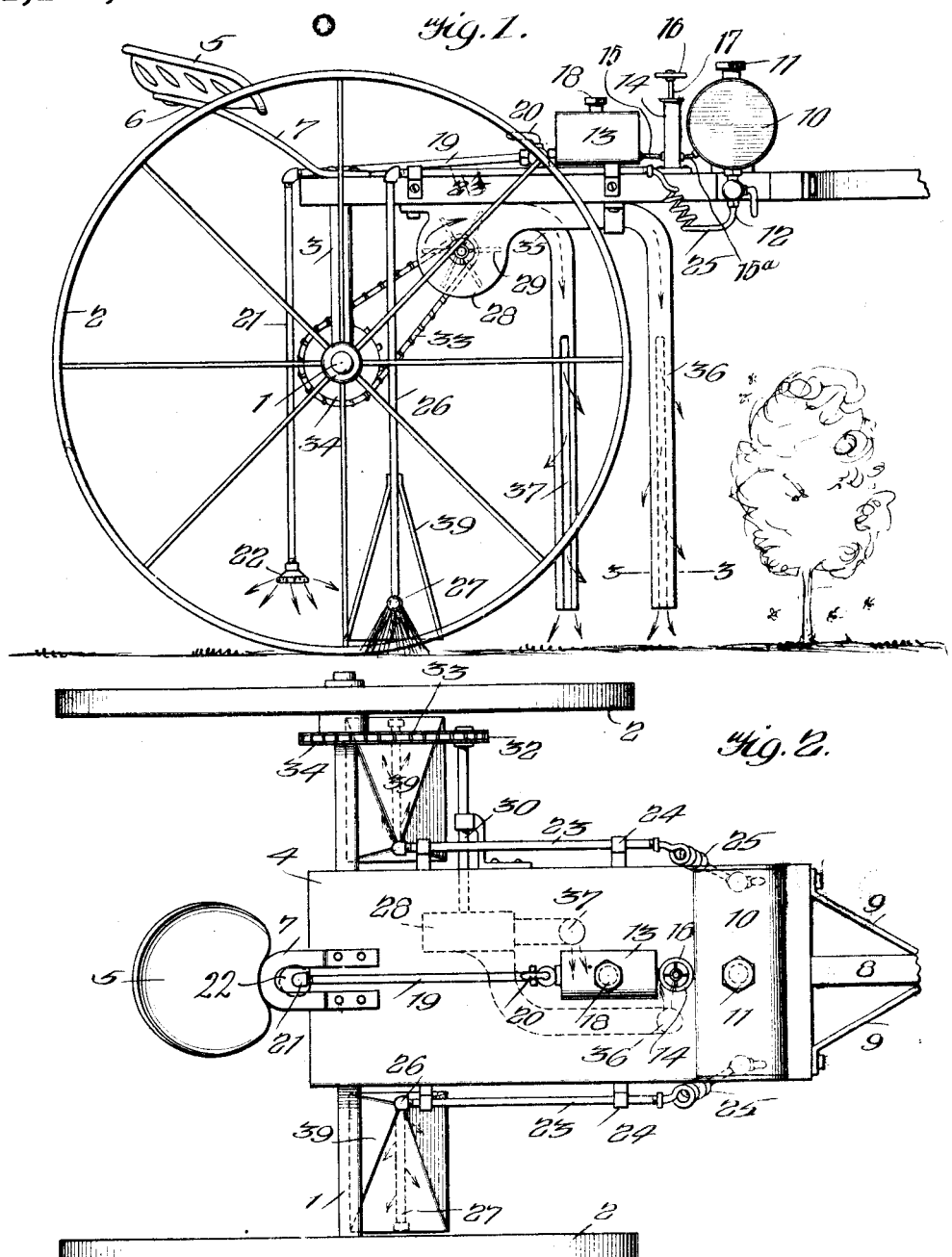
WITNESSES
INVENTOR
MERCER D. BAREFIELD,
BY
ATTORNEYS

UNITED STATES PATENT OFFICE.

MERCER DEAN BAREFIELD, OF HOLLANDALE, MISSISSIPPI.

INSECT-DESTROYER.

1,131,458.  Specification of Letters Patent.  Patented Mar. 9, 1915.

Application filed July 9, 1914. Serial No. 849,968.

*To all whom it may concern:*

Be it known that I, MERCER D. BAREFIELD, a citizen of the United States, and a resident of Hollandale, in the county of Washington and State of Mississippi, have invented a new and useful Improvement in Insect-Destroyers, of which the following is a specification.

My invention is an improvement in insect destroyers, and has for its object to provide a device of the character specified, wherein a wheel supported frame is provided, upon which is mounted a fan having delivery pipes, spaced apart and laterally and longitudinally of the frame and adapted to move on opposite sides of the row of plants to blow the insects and the like into the furrows at each side of the row and having in addition mechanism for burning the insects after they have been blown into the rows, and having other mechanism for spraying the plants with an insecticide.

In the drawings:—Figure 1 is a side view of the improved machine, Fig. 2 is a top plan view, and Fig. 3 is a section on the line 3—3 of Fig. 1.

The present embodiment of the invention comprises a framework consisting of an axle 1 and wheels 2, journaled on the ends of the axle. The axle is provided with an arch 3, intermediate its ends, and a frame plate 4 is connected at its rear end to the arch. A seat 5 is connected to the frame plate at the rear end thereof by means of a resilient yoke, the body 6 of the yoke being secured to the seat, and the arms 7 of the yoke extending forwardly and downwardly and being connected to the upper face of the frame plate. A tongue 8 is connected to the front end of the frame plate, and inclined braces 9 are arranged on each side of the tongue between the same and the frame plate. A tank or container 10 is supported by the frame plate at the front thereof, the said tank having a filling opening at its center normally closed by a plug 11. The filling opening is at the center of the tank on the upper side thereof, and at each end on the under side the tank is provided with an outlet port, having a valve casing 12, connected therewith for controlling the flow of the material from the tank. A second tank 13 is arranged behind the tank 11, and a pump cylinder 14 may be connected to either tank 10 or 13 by a flexible pipe 15 to supply the tank with air under pressure. The cylinder is provided with a plunger, not shown, and operated by a wheel handle 16, connected to the stem 17 of the plunger, and the tank 13 is provided with a filling opening intermediate its ends normally closed by a plug 18.

A pipe 19 extends rearwardly from the tank 13, and a valve casing 20 is interposed between the pipe and the tank 13. The pipe 19 extends rearwardly between the arms 7 of the yoke and then downwardly as indicated at 21, behind the axle. At its lower end the pipe 21 is provided with a spray head 22, and each of the valve casings 12 is connected with a pipe 23, which is supported in bearing arms 24 at the adjacent side of the frame plate 4, by means of a flexible pipe 25. Pipes 26 extend downwardly from the rear ends of the pipes 23, and a pipe 27 extends outwardly from the lower end of each of the downwardly extending pipes 26. Each of the pipes 27 is a discharge pipe, having a series of discharge openings opening downwardly.

A fan casing 28 is supported beneath the frame plate, the said casing having a fan 29 therein, connected to a shaft 30, which is supported in a bearing arm 31, depending from the frame plate 4. A sprocket wheel 32 is connected with the outer end of the shaft 30, and a sprocket chain 33 connects the said sprocket wheel with a sprocket wheel 34 secured to one of the wheels and coaxial with the said wheel. By means of the sprocket chain 33 the shaft 30 is rotated, and the fan 29 is operated to force a current of air through tangential outlet pipes 35 and 36 of the casing. Each of the said pipes extends forwardly and downwardly in front of the axle, and the pipe 36 is ahead of the pipe 35. The said pipes are also spaced apart laterally from each other as shown more particularly in Fig. 2. Each of the said pipes 35 and 36 is provided near its lower end with a longitudinally extending slot 37, and the said slots open inwardly as shown more particularly in Fig. 3. The lower end of each of the said pipes is partially closed, being provided with an X-shaped opening 38.

In operation, the machine is drawn through the field in any desired manner, with the pipes 35 and 36 on opposite sides of the row. It will be noticed that not only are these pipes on opposite sides of the row but they are offset with respect to each other. As the machine is drawn through the field the fan will be operated to force a current of air through each pipe transversely of the plants. It will be obvious that all insects, bugs, worms, punctured squares, and the like, will be blown from the plants to the middle of the furrow. The pipes 27 are burners, and the tank 10 is designed to contain a liquid fuel, as for instance, gasolene, kerosene, or the like. The fuel is forced out by the air under pressure through the burners, and it is obvious that all of the bugs and the like, as well as eggs and embryos will be burned. The discharge pipes 35 and 36 blow all of this material laterally from the rows of plants, and the burners 27 are supported directly above the centers of the furrows, and in position to destroy by burning all of the insects and the like, blown off the plants by the pipes 35 and 36. The tank 13 is designed to contain kerosene and moth balls or other camphoraceous material to kill the insects, and this material is sprayed on the plants from the spray head 22 after the burners 27 have acted upon the same.

It will be evident that the machine operates not by suction but by draft, blowing the insects off the plants on to the ground instead of sucking them into sacks or other containers to be afterward destroyed. The insects are destroyed as they lie on the ground. The axle arch 3 is of a height to permit the machine to pass over the plants.

To prevent injury to the growing plants, each of the burners 27 is provided with a hood 39, the said hood being supported by the adjacent pipe 26, and arranged above and on every side of the same. The hoods as will be noticed from an inspection of Fig. 2 are pyramidal in shape, having their large ends open and having said large ends downward, and the apex of each hood is connected to the adjacent pipe 26.

It will be evident from a description that the discharge pipes of the fan are on opposite sides of the plants, blowing the insects between the row being operated on and the adjacent rows. Here the burners come into action and burn the insects, after which the spray is turned on to the plants to prevent return of the insects.

In practice the lower ends of the tubes 36 are provided with X-shaped openings to reduce the bore of the tubes, that is, the open ends are partially closed, the said ends being left partially open to prevent the killing of the blast by leaves or the like in the longitudinal slots. The pump 14 is shown connected to both container 10 and the tank 13. A tube 15 connects the pump to the tank 13, while a tube 15ª connects the pump to the tank 10. A valve may be arranged in each tube and that in use is closed by the valve.

I claim:—

1. An insect destroyer, comprising a wheel supported frame, a fan casing supported by the frame, a fan in the casing and having a driving connection with one of the wheels, said casing having outlet pipes extending forwardly and downwardly and spaced apart laterally and longitudinally of the machine, each pipe having a longitudinal slot in its inner side and having an opening in its bottom, said pipes being designed to pass on opposite sides of a row of plants and to blow the insects laterally from the plants, a tank supported by the frame at the front thereof and having delivery pipes extending downwardly in front of the axles on each side of the frame, a valve for controlling each pipe, each pipe having at its lower end an outwardly extending burner having outlet openings extending downwardly, and a hood over each burner.

2. An insect destroyer, comprising a wheel supported frame, a fan casing supported by the frame, a fan in the casing and having a driving connection with one of the wheels, said casing having outlet pipes leading forwardly and downwardly and spaced apart laterally and longitudinally of the machine, each pipe having a longitudinal slot in its inner side and having an opening in its bottom, said pipes being designed to pass on opposite sides of a row of plants and to blow the insects laterally from the plants.

3. An insect destroyer, comprising a wheel supported frame, a fan casing supported by the frame, a fan in the casing and having a driving connection with one of the wheels, delivery pipes leading from the said casing downwardly, said pipes being spaced apart laterally and longitudinally of the frame, and each having a longitudinally extending delivery opening at its inner side, a tank for containing fuel supported by the frame, burners arranged at each side of the frame and outside the adjacent delivery pipe from the fan, each of the said pipes having an outwardly extending burner discharged downwardly.

4. An insect destroyer, comprising a wheel supported frame, a fan casing supported by the frame, a fan in the casing and having a driving connection with one of the wheels, delivery pipes leading from the said casing downwardly, said pipes being spaced apart laterally and longitudinally of the frame, and each having a longitudinally extending delivery opening at its inner side.

5. An insect destroyer comprising a wheel supported frame, delivery pipes depending from the frame, said pipes being spaced apart laterally and longitudinally of the frame, each pipe having a longitudinally extending delivery opening at its inner side, and means operated by the wheels for discharging a current of air through the said pipes.

MERCER DEAN BAREFIELD.

Witnesses:
E. F. S...,
J. D. S... .